United States Patent
Ganju et al.

(10) Patent No.: US 12,229,296 B2
(45) Date of Patent: Feb. 18, 2025

(54) SYSTEMS, METHODS, AND APPARATUSES FOR SECURING OWNERSHIP OF OBJECTS IN A DIGITAL LEDGER

(71) Applicant: Mellanox Technologies, Ltd., Yokneam (IL)

(72) Inventors: Siddha Ganju, Santa Clara, CA (US); Elad Mentovich, Tel aviv (IL); Andrew Russell, Weston, FL (US)

(73) Assignee: Mellanox Technologies, Ltd., Yokneam (IL)

( * ) Notice: Subject to any disclaimer, the term of this patent is extended or adjusted under 35 U.S.C. 154(b) by 239 days.

(21) Appl. No.: 17/863,779

(22) Filed: Jul. 13, 2022

(65) Prior Publication Data

US 2024/0020401 A1    Jan. 18, 2024

(51) Int. Cl.
*G06F 21/62*    (2013.01)

(52) U.S. Cl.
CPC .................. *G06F 21/6218* (2013.01)

(58) Field of Classification Search
CPC ................................................. G06F 21/6218
See application file for complete search history.

(56) References Cited

U.S. PATENT DOCUMENTS

| | | | |
|---|---|---|---|
| 9,077,577 B1 | 7/2015 | Ashrafi et al. | |
| 9,356,780 B2 | 5/2016 | Tanizawa et al. | |
| 11,334,882 B1 * | 5/2022 | Jameson | H04L 9/3231 |
| 11,451,308 B1 | 9/2022 | Bucklew et al. | |
| 11,870,897 B1 * | 1/2024 | Griffin | H04L 9/3247 |
| 2008/0165957 A1 | 7/2008 | Kandasamy et al. | |
| 2013/0101119 A1 | 4/2013 | Nordholt et al. | |
| 2017/0214525 A1 | 7/2017 | Zhao et al. | |
| 2021/0176072 A1 * | 6/2021 | Chalkias | H04L 9/3297 |
| 2022/0006627 A1 | 1/2022 | Ko et al. | |
| 2022/0383305 A1 * | 12/2022 | Smith | G06Q 20/3827 |
| 2023/0110628 A1 * | 4/2023 | Heckey | G06F 9/5038 |
| 2023/0112482 A1 * | 4/2023 | Stockert | G06N 20/00 |
| | | | 707/822 |

OTHER PUBLICATIONS

Dtakahashi, Dean, "Twitch cofounder Justin Kan is back with NFT gaming market place Fractal", Gamesbeat, (Dec. 2021) https://venturebeat.com/2021/12/13/twitch-cofounder-justin-kan-is-back-with-nft-gaming-marketplace-fractal/.

Kass, Michael, LinkedIn post entitled "Plumbing the Metaverse with USD", (Mar. 2021), https://www.linkedin.com/pulse/plumbing-metaverse-usd-michael-kass/?trackingId=y2PXzhkR76bnLEoMzY2ilw%3D%3D.

Notice of Allowance issued Mar. 14, 2023, in pending U.S. Appl. No. 17/227,321.

* cited by examiner

*Primary Examiner* — Darshan I Dhruv
(74) *Attorney, Agent, or Firm* — Anup Iyer; Moore & Van Allen PLLC

(57) ABSTRACT

Various embodiments of the present disclosure provide for generating and managing a digital ledger access system and its associated objects. An example method is configured for securing objects in a digital ledger of objects by identifying an object from amongst a plurality of objects in the digital ledger of objects and generating a quantum token for attachment with the object. The method includes deriving one or more classical public keys associated with the quantum token and determining an attempt to access the object. The method provides access to the object in response to a validation of the classical public key based on the quantum token, and the method precludes access to the object in response to an invalidation of the classical public key based on the quantum token.

20 Claims, 5 Drawing Sheets

SYSTEMS, METHODS, AND APPARATUSES FOR SECURING OWNERSHIP OF OBJECTS IN A DIGITAL LEDGER

TECHNOLOGICAL FIELD

Embodiments of the present disclosure relate generally to digital ledgers, and, in particular, to processes for accessing objects within a digital ledger of objects based on quantum tokens and associated verified classical public keys.

BACKGROUND

Digital ledgers, distributed ledgers, blockchains, and other database systems operate as a consensus of replicated, shared, and synchronized data in a decentralized environment. These databases are often used to secure data in that they provide a permanent (e.g., immutable, unalterable, etc.) repository for information. Through applied effort, ingenuity and innovation, various identified deficiencies and problems associated with digital ledgers have been solved by developing solutions that are configured in accordance with the embodiments of the present disclosure, many examples of which are described in detail herein.

BRIEF SUMMARY

To solve these issues and others, embodiments of the present disclosure provide systems, methods, and apparatuses for securing ownership of objects in a digital ledge by utilizing quantum tokens and associated verified classical public keys. With reference to an example method, the embodiments of the present disclosure provide a method for securing objects in a digital ledger of object. The method may include identifying an object from amongst a plurality of objects in the digital ledger of objects and generating a quantum token for attachment with the object. The method may further include deriving one or more classical public keys associated with the quantum token and determining an attempt to access the object. In response to a validation of the classical public key based on the quantum token, the method may provide access to the object. In response to an invalidation of the classical public key based on the quantum token, the method precluding access to the object.

In some embodiments, the method may further include authenticating a session of a user associated with the one or more classical public keys based on a user-specific passcode.

In some embodiments, each object of the plurality of objects includes an object-specific quantum token.

In some further embodiments, an object-specific classical public key may be derived for each object-specific quantum token.

In some further embodiments, a plurality of object-specific classical public keys may be generated for each object-specific quantum token.

In some still further embodiments, each object-specific classical public key may be associated with a respective resolution access level of the object such that a resolution of the object varies based upon the object-specific classical public key validated to provide access to the object.

In some embodiments, precluding access to the object may further include determining a security priority for each of the objects of the plurality of objects. In such an embodiment, the method may include modifying a mechanism by which access to the object is precluded based upon the determined security priority for the object.

In some further embodiments, the security priority for each object of the plurality of objects may be determined based at least in part upon a resource usage parameter associated with generating the respective object.

In other further embodiments, the security priority for each of the objects of the plurality of objects may be determined based at least in part upon a user associated with the quantum token attached with the object.

In some embodiments, precluding access to the object may include one or more of collapsing a state of the object, generating a message interface object including an indication of the invalidation of the one or more classical public keys, or generating an input request for providing to a user associated with the object.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF DRAWINGS

Figure 1:
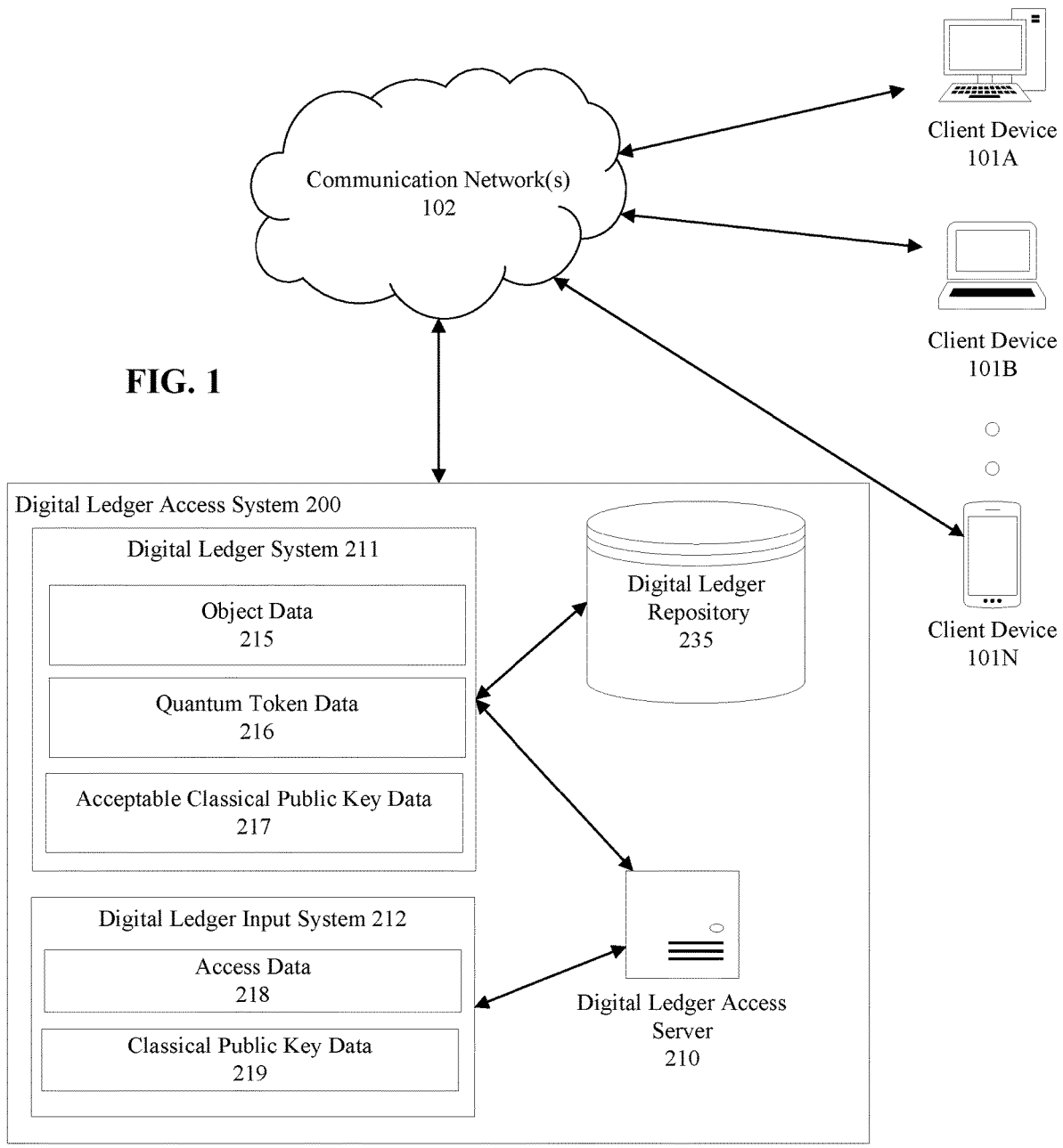
Figure 2:
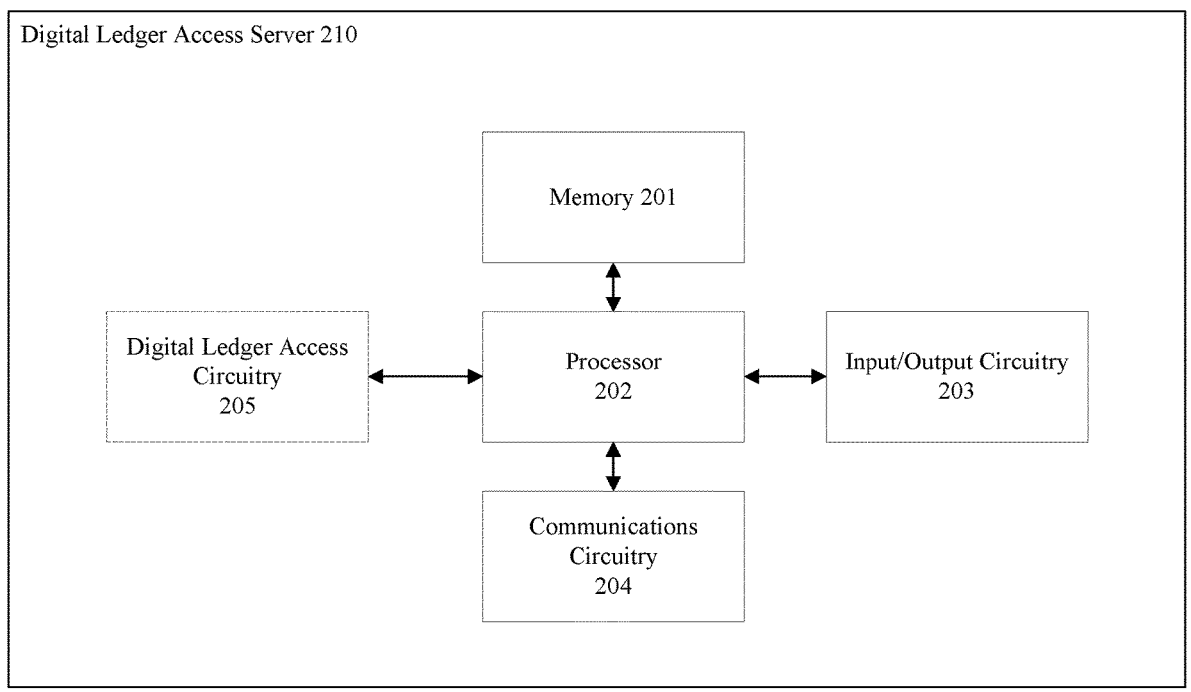
Figure 3:
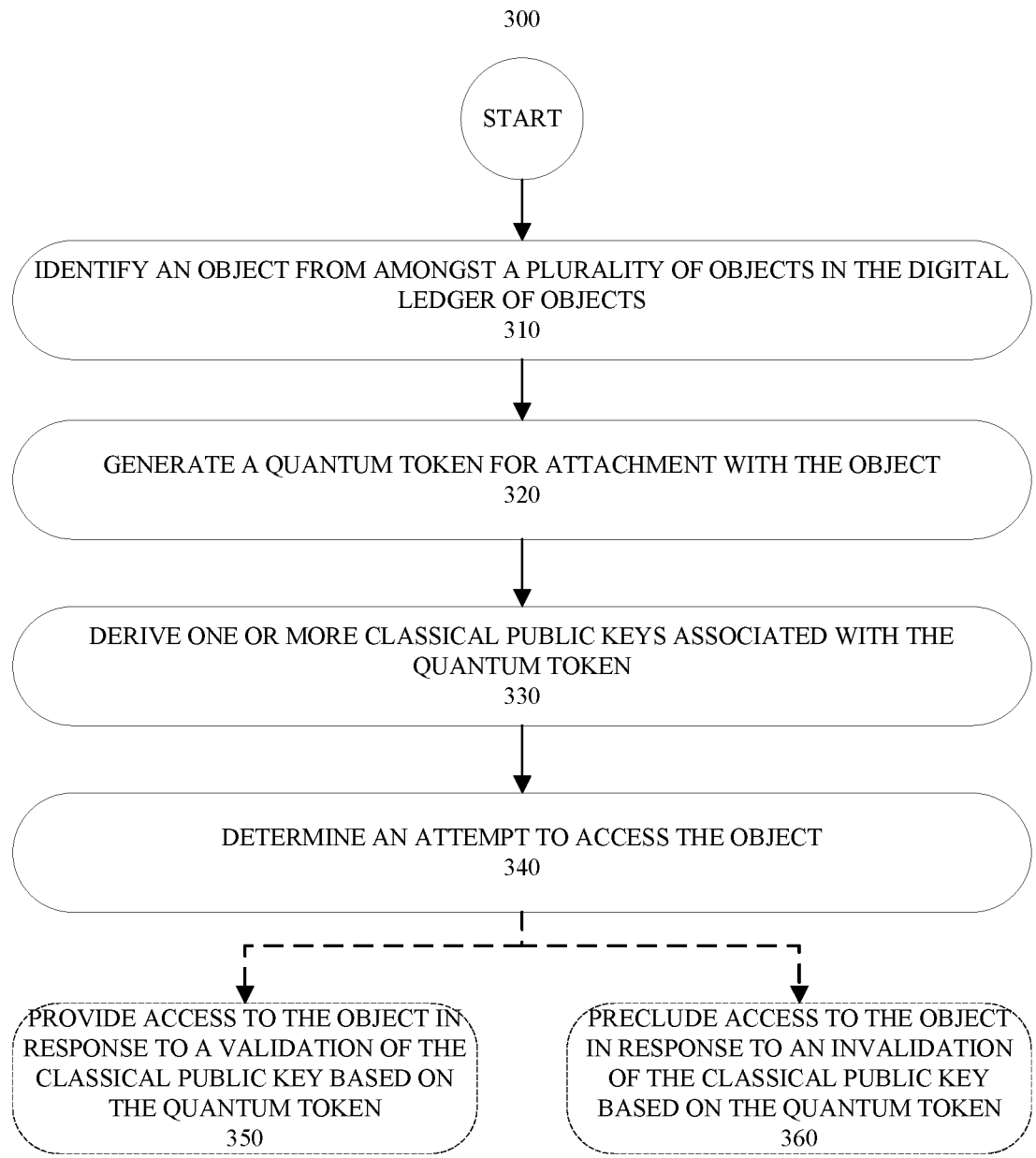
Figure 4:
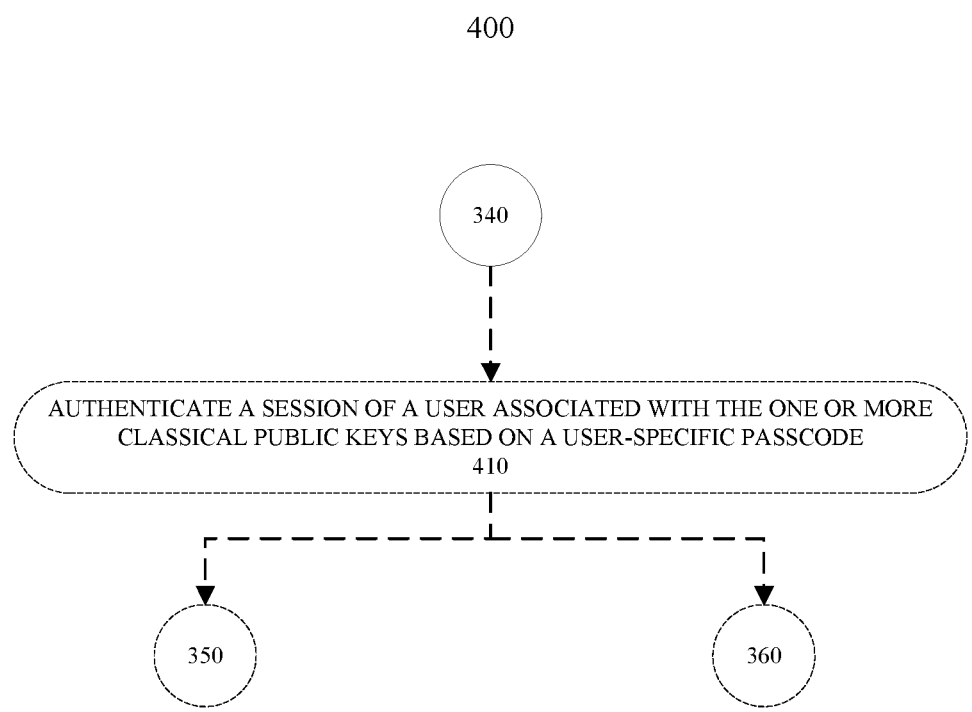
Figure 5:
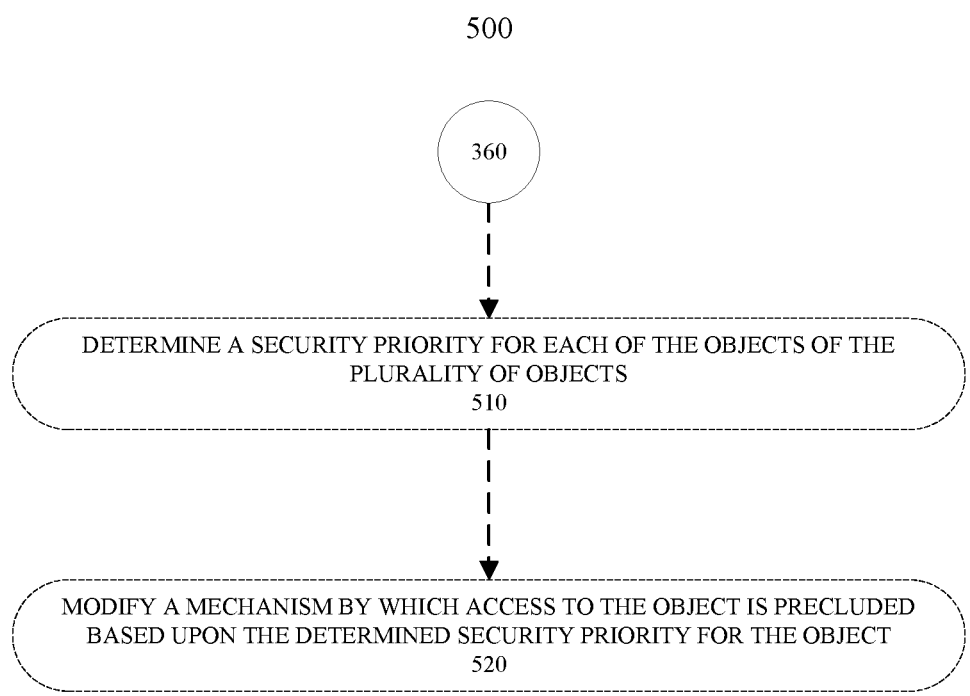

Having thus described the disclosure in general terms, reference will now be made to the accompanying drawings, which are not necessarily drawn to scale, and wherein:

FIG. 1 is an exemplary block diagram of a digital ledger access system, along with its accompanying components, in accordance with one or more embodiments of the present disclosure;

FIG. 2 is an exemplary block diagram of a digital ledger access server, in accordance with one or more embodiments of the present disclosure;

FIG. 3 illustrates an example flowchart of a method for determining an attempt to access an object of the digital ledger and the provision or preclusion of access to the object, in accordance with one or more embodiments of the present disclosure;

FIG. 4 illustrates an example flowchart of a method for authenticating a session of a user, in accordance with one or more embodiments of the present disclosure; and FIG. 5 illustrates an example flowchart of a method for modifying a mechanism by which access to the object is precluded, in accordance with one or more embodiments of the present disclosure.

DETAILED DESCRIPTION

Definitions

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. As used herein, terms such as "front," "rear," "top," "inside," "outside," "inner," "outer," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The term "object" refers to a digital content object that is a digital representation of an asset or resource that is tracked and managed by a digital ledger (e.g., a digital ledger of objects). Objects define discrete assets within a digital ledger as defined hereafter, such as a physical asset (e.g., computer such as a personal computer/desktop computer, furniture, vehicle, vehicle renderings, furniture renderings, presentations, real estate, etc.), a digital asset (e.g., software, digital renderings of physical assets, unique renderings of assets such as artwork, and/or the like), a set of data, or any other tangible or intangible asset (e.g., intellectual property) that may be registered, known, or accessed by the digital ledger access system. For example, an object may be a digital representation of an asset, wherein the object (and any of its accompanying data) are uploaded or otherwise stored in a digital ledger repository accessible by the digital ledger access system. In some embodiments, each object may further be associated with an "object checklist" that defines the ways in which a user may interact with a particular object, the security considerations associated with the particular object, the resolution(s) associated with the object as defined hereinafter, and/or the like.

The terms "digital ledger of objects" and/or "digital ledger" refer to a ledger, database, and/or archive of object data, which tracks object data including access information of specific objects, modifications to objects, and/or the like to form a chain or "ledger" of various objects after each access and/or change, while maintaining the previous version/versions of the objects. In some embodiments, the digital ledger of objects may be likened to what is commonly referred to in the art as a "distributed ledger" or "block chain." In some embodiments, the digital ledger may include features such as a decentralized feature (e.g., not governed by a singular entity), distributed ledgers (e.g., distribution of computational power to the users for network maintenance), and/or a timeline of objects that are linked together based on their shared object data and based on a timeline of activity for the objects within the chain. In words, the present disclosure contemplates the digital ledger of objects described herein may refer to any immutable, decentralized, unalterable, and/or transparent database system within which them embodiments described herein may be implemented.

The term "quantum token" refers to data encrypted using a quantum cryptography algorithm or post-quantum cryptography algorithm, where such a quantum cryptography algorithm or post-quantum cryptography algorithm relies on a quantum mechanism to encrypt the data. In some embodiments, the quantum token may comprise quantum states (e.g., hidden qubit states), wherein the quantum token is based on and attached to an object within a digital ledger of objects.

The terms "classical public key" or "classical public keys" refer to a numerical value used to determine the legitimacy of a user to access an object. The classical public keys described herein may be generated by a certificate authority that may issue a digital certificate to prove an object owner's and/or user's identity and contain the owner's and/or user's public key. Each generated classical public key may be paired with an object-specific quantum token. The classical public key may be generated by an asymmetric algorithm based on the object-specific quantum token.

The term "user-specific passcode" refers to one or more items of data by which a specified user of the system (e.g., digital ledger access system 200 and/or digital ledger access server 210) may be uniquely identified. For example, a user-specific passcode may comprise text and/or numbers, which may be converted into computer-readable content that may comprise ASCII text, a pointer, a memory address, and the like.

The term "resolution" may be used herein to refer to the mechanism by which access to a specific object in the digital ledger is provided. In some embodiments, the resolution may refer to a resolution access level defining the resolution at which the underlying object is viewed (e.g., measured in total activated pixels, pixels per inch (PPI), or the like). This resolution may vary based upon the access provided to a particular user (e.g., due to specific classical public keys, quantum tokens, etc. associated with the access or object). By way of a non-limiting example, the provision of access may include the ability of a user to view or see the object (e.g., at a specified resolution) while the preclusion of access may at least partially prevent the user's ability to clearly see or view the object (e.g., reduced resolution, obscured pixels, etc.). By way of another, non-limiting example, the resolution may refer to the coloring or lack thereof provided to an object (e.g., particular access levels only viewing objects in grayscale), and may further include the overlaying or addition of opaque or translucent markers, screens, or other obscuring elements that at least partially prevent viewing of the complete object.

In some embodiments, the "resolution" described herein may further refer to the ability or inability of a user to view or access particular portions of the object. By way of example, in some embodiments, the object stored by the digital ledger may be associated with an artificial intelligence (AI) model, machine learning model, neural network architecture, and/or the like. In such an example, the variable resolution provided to the user based upon access level may refer to particular portions (e.g., weighted parameters) of the example AI model as opposed to the entire AI architecture. Although described herein with reference to an AI model, the present disclosure contemplates that the embodiments described herein may selectively allow or prevent access to any portion of the object stored by the digital ledger and that access may refer to any means (e.g., listening, viewing, modifying, interacting with, etc.) by which the user interacts with the object. Furthermore, the resolution described herein may further include a time period during which access is provided to a particular user (e.g., as defined by the associated classical key, quantum token, etc.). In some embodiments, the time period associated with the access or resolution for a particular object may further be user or device specific such that, for example, a particular user device is authenticated and provided access to a particular object at a particular resolution for the time period associated with the user, access level, object, etc.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The terms "server" or "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

Having set forth a series of definitions called-upon throughout this application, an example system architecture is described below for implementing example embodiments and features of the present disclosure.

Example System Architecture

Methods, apparatuses, systems, and computer-program products of the present disclosure may be embodied by any of a variety of computing devices. For example, the method, apparatus, system, and computer-program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates a digital ledger access system 200 configured to communicate with one or client devices 101A-101N in accordance with some example embodiments described herein. Users may access a digital ledger access system 200 via a communications network 102 using one or more of client devices 101A-101N, and the digital ledger access system 200 may comprise a digital ledger system 211, digital ledger access server 210 in communication with at least one repository (e.g., such as the digital ledger repository 235), and/or a digital ledger input system 212 that is likewise in communication with the digital ledger access server 210. The digital ledger repository 235, and likewise other repositories, may be hosted by digital ledger access server 210 (of FIG. 2) or otherwise hosted by devices in communication with the digital ledger access server 210. The digital ledger access system 200 is, in some embodiments, able to generate a digital ledger access interface which may comprise a message interface object (e.g., which may alert an owner of an object that access was granted or denied for an attempt to access an object) and/or object data, wherein the digital ledger access interface is in association with the digital ledger access system 200, as will be described below.

Digital ledger access server 210 may include circuitry, networked processors, or the like configured to perform some or all of the digital ledger access server-based processes described herein (e.g., accessing object data, generating and accessing quantum token data, generating and accessing acceptable classical public key data, accessing access data provided by a user, and/or accessing classical public key data associated with the user of the access data, and/or the like), and may be any suitable network server and/or other type of processing device. In this regard, the digital ledger access server 210 may be embodied by any of a variety of devices, for example, the digital ledger access server 210 may be embodied as a computer or a plurality of computers. For example, the digital ledger access server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the digital ledger access server 210 may be located remotely from the digital ledger repository 235, although in other embodiments, the digital ledger access server 210 may comprise the digital ledger repository 235. The digital ledger access server 210 may, in some embodiments, comprise several servers or computing devices performing interconnected and/or distributed functions. Despite the many arrangements contemplated herein, the digital ledger access server 210 is shown and described herein as a single computing device to avoid unnecessarily overcomplicating the disclosure.

The digital ledger access server 210 may communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the digital ledger access system 200.

The digital ledger repository 235 may be stored by any suitable storage device configured to store some or all of the information described herein (e.g., memory 201 of digital ledger access server 210 or a separate memory system separate from the digital ledger server 210, such as one or more database systems, backend data servers, network databases, cloud storage devices, or the like provided by another device (e.g., online application or 3rd party provider), such as a Network Attached Storage (NAS) device or devices, or as a separate database server or servers). Digital ledger repository 235 may comprise data received from the digital ledger access server 210 (e.g., via a memory 201 and/or processor(s) 202) and/or a client device 101A-101N, and the corresponding storage device may thus store this data. Digital ledger repository 235 may include information accessed and stored by the digital ledger access server 210 to facilitate the operations of digital ledger access system 200. As such, the digital ledger repository 235 may include, for example, without limitation, digital ledger access data such as object data 215, quantum token data 216 (e.g., which may be associated with object-specific quantum tokens), acceptable classical public key data 217 (e.g., which may be associated with the acceptable classical public key associated with an object-specific quantum token for specific object(s)), access data 218 (e.g., which may comprise user authentication data), classical public key data 219 (e.g., which may be associated with the classical public key provided by the user attempting to access an object), and/or the like.

The client devices 101A-101N may be implemented as any computing device as defined above. That is, the client devices 101A-101N may also include circuitry, networked processors, or the like configured to perform some or all of the apparatus-based processes described herein and may include a suitable network server and/or other type of processing device (e.g., a controller or computing device of the client devices 101-101N). Electronic data received by the digital ledger access server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the digital ledger access interface to a user and otherwise providing access to the digital ledger access system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one digital ledger access interface, which may be provided by the digital ledger access system 200.

In embodiments where a client device 101A-101N is a mobile device, such as a smartphone or tablet, the client device 101A-101N may execute an "app" to interact with the digital ledger access system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the digital ledger access system 200 via a web browser. As yet another example, the client devices 101A-101N may include various hardware or firmware designed to interface with the digital ledger access system 200. Example embodiments contemplated herein may have various form factors and designs but will nevertheless include at least the components illustrated in FIG. 2 and described in connection therewith.

Example Server Device

FIG. 2 shows a schematic block diagram of example circuitry, some or all of which may be included in a digital ledger access server 210. In accordance with some example embodiments, digital ledger access server 210 may include various means, such as memory 201, processor 202, input/output circuitry 203, and/or communications circuitry 204. Moreover, in some embodiments, digital ledger access circuitry 205 may also or instead be included in the digital ledger access server 210. For example, where digital ledger access circuitry 205 is included in digital ledger access server 210, digital ledger access circuitry 205 may be configured to facilitate the functionality discussed herein regarding generating, causing storage of, updating, and/or retrieving digital ledger access interface(s). An apparatus, such as digital ledger access server 210, may be configured, using one or more of circuitry 201-205, to execute the operations described above with respect to FIG. 1 and below in connection with FIGS. 3-5.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the digital ledger access server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the digital ledger access server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, digital ledger access server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., digital ledger access server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling digital ledger access server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by digital ledger access server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as digital ledger access server 210. The plurality of processors may be in operative communication with each other and may be collectively configured to perform one or more functionalities of the digital ledger access server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause digital ledger access server 210 to perform one or more of the functionalities of digital ledger access server 210 as described herein.

In some embodiments, digital ledger access server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like.

The processor 202 and/or user interface circuitry comprising the processor 202 may be configured to control one or more functions of a display or one or more user interface elements through computer-program instructions (e.g., software and/or firmware) stored on a memory accessible to the processor 202 (e.g., memory 201, and/or the like). In some embodiments, aspects of input/output circuitry 203 may be reduced as compared to embodiments where digital ledger access server 210 may be implemented as an end-user machine or other type of device designed for complex user interactions. In some embodiments (like other components discussed herein), input/output circuitry 203 may even be eliminated from digital ledger access server 210. Input/output circuitry 203 may be in communication with memory 201, communications circuitry 204, and/or any other component(s), such as via a bus. Although more than one input/output circuitry and/or other component can be included in digital ledger access server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with digital ledger access server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by digital ledger access server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of digital ledger access server 210, such as via a bus.

In some embodiments, the digital ledger access circuitry 205 may also or instead be included and configured to perform the functionality discussed herein related to generating and updating a digital ledger access interface(s). In some embodiments, digital ledger access circuitry 205 includes hardware, software, firmware, and/or a combination of such components, configured to support various aspects of such digital ledger access interface-related functionality, features, and/or services of the digital ledger access server 210 as described herein (e.g., designed to generate a digital ledger access interface based on at least the validation of the classical public key for accessing the object which is determined by the digital ledger access system 200 and/or digital ledger access server 210). It should be appreciated that in some embodiments, the digital ledger access circuitry 205 performs one or more of such exemplary actions in combination with another set of circuitry of the digital ledger access server 210, such as one or more of memory 201, processor 202, input/output circuitry 203, and communications circuitry 204.

For example, in some embodiments, digital ledger access circuitry 205 utilizes processing circuitry, such as the processor 202 and/or the like, to perform one or more of its corresponding operations. In a further example, and in some embodiments, some or all of the functionality digital ledger access circuitry 205 may be performed by processor 202. In this regard, some or all of the example processes and algorithms discussed herein can be performed by at least one processor 202 and/or digital ledger access circuitry 205. It should also be appreciated that, in some embodiments, digital ledger access circuitry 205 may include a separate processor, specially configured field programmable gate array (FPGA), or application specific interface circuit (ASIC) to perform its corresponding functions.

Additionally or alternatively, in some embodiments, digital ledger access circuitry 205 utilizes memory 201 to store collected information. For example, in some implementations, digital ledger access circuitry 205 includes hardware, software, firmware, and/or a combination thereof, that interacts with at least one of the digital ledger repository 235, and/or memory 201 to send, retrieve, update, and/or store data values embodied by and/or associated with object data, quantum token data, acceptable classical public key data, access data, classical public key data, and associated data that is configured for association with, for example, generating and/or updating a digital ledger access interface, and to support the operations of the digital ledger access circuitry 205 and the remaining circuitry. Additionally or alternatively, in some embodiments, the digital ledger access circuitry 205 utilizes input/output circuitry 203 to facilitate user output (e.g., causing rendering of one or more user interface(s) such as a digital ledger access interface), and/or to receive user input (e.g., user clicks, user taps, keyboard interactions, user gesture, and/or the like). Additionally or alternatively still, in some embodiments, the digital ledger access circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of digital ledger access server 210 to implement various operations, including the examples shown herein. As such, a series of computer-readable program code portions may be embodied in one or more computer-program products and can be used, with a device, digital ledger access server 210, database, and/or other programmable apparatus, to produce the machine-implemented processes discussed herein. It is also noted that all or some of the information discussed herein can be based on data that is received, generated and/or maintained by one or more components of the digital ledger access server 210. In some embodiments, one or more external systems (such as a remote cloud computing and/or data storage system) may also be leveraged to provide at least some of the functionality discussed herein.

Example Operations for Accessing an Object in a Digital Ledger of Objects

The method, apparatus (e.g., communication access server 210), and computer-program product of an example embodiment will now be described in conjunction with the operations illustrated in FIGS. 3-5.

FIG. 3 depicts a flowchart that illustrates a series of operations or process blocks for determining an attempt to access the object and the provision or preclusion of access in response to a validation of the classical public key, in accordance with some example embodiments of the present disclosure. The operations illustrated in FIG. 3 may, for example, be performed by, with the assistance of, and/or under the control of one or more apparatuses, such as digital ledger access server 210, as described above. In this regard, performance of the operations may invoke one or more of memory 201, processor 202, input/output circuitry 203, communications circuitry 204, and/or digital ledger access circuitry 205. Certain operations may be considered optional, as indicated by the dashed lines.

As shown at operation 310, the apparatus (e.g., digital ledger access server 210) includes means, such as processor 202, input/output circuitry 203, communications circuitry 204, digital ledger access circuitry 205, and/or the like, for identifying an object from amongst a plurality of objects in the digital ledger of objects. By way of non-limiting example, an object may be identified by user input into a client device (e.g., client device 101A-101N), wherein the user input may include an identifier of a specific object within the digital ledger of objects. Such an identifier may be used to identify a specific object within a sequence of objects within the digital ledger of objects (e.g., a specific version of a sequence of objects), for which the user may have access to the specified object. In some embodiments, the user may not have access to the specifically identified object and this instance may be described in further detail below with respect to operation 360 and method 500 of FIG. 5.

In some embodiments, the object may be identified by the system (e.g., digital ledger access server 210 and/or digital ledger access system 200) based on a user's interaction with the digital ledger access server 210 and/or digital ledger access system 200 (e.g., via a client device 101A-101N), such as a user's input of user authentication data (e.g., a user's credentials like a username/user identifier and/or user-specific passcode such as a password). In some embodiments, the digital ledger access server 210 and/or digital ledger access system 200 may identify a single object and/or a plurality of objects that the user associated with the user authentication data may access. By way of non-limiting example, the identification of a plurality of objects that may be accessed by the user based on the user's authentication data may be likened to a single sign-on authentication.

In some embodiments, the digital ledger access server 210 and/or digital ledger access system 200 may identify a specific group of objects that may be likely for the user to access, such as by previous user interactions with the digital ledger access server 210 and/or digital ledger access system 200. For instance, the digital ledger access server 210 and/or digital ledger access system 200 may track (e.g., such as by a digital ledger access log based on a specific user and/or group of users within an organization) previous interactions with objects in the digital ledger of objects. In some embodiments, and based on these previous interactions, the digital ledger access server 210 and/or digital ledger access system 200 may present (e.g., by configuring a graphical user interface of the client device(s) 101A-101N) a list of potential objects the user may like to access, and such a list may be presented before and/or after the digital ledger access server 210 and/or digital ledger access system 200 has received user authentication data. Based on this list of potential objects, a user may select or identify an object.

As shown at operation 320, the apparatus (e.g., digital ledger access server 210) includes means, such as processor 202, input/output circuitry 203, communications circuitry 204, digital ledger access circuitry 205, and/or the like, for generating a quantum token for attachment with the object. By way of non-limiting example, a quantum token may be generated by the digital ledger access server 210 and/or digital ledger access system 200 by taking a stored quantum state, wherein the state is unknown to the recipient of the token and/or user of the public key, by which the quantum state cannot be copied without destroying or modifying the state the original quantum state. Although described herein with reference to generation of the quantum token by the digital ledger access server 210 and/or the digital ledger access system 200, the present disclosure contemplates that the quantum token may be generated by any technique or mechanism, such as an optical token generator, alone or in combination with any of the components described herein.

In some embodiments, once the quantum token has been generated, the quantum token may be attached to a specific object of the digital ledger of objects. By way of non-limiting example, during the generation of the quantum token, the quantum token may be specifically generated for a specific object to generate an object-specific quantum token, such that only a quantum token specifically generated for a specific object may be attached to said specific object. For instance, when the object-specific quantum token is being generated, an identifier or other data associated with the specific object may be used during the quantum token's generation and/or the identifier or other data associated with the specific object may be attached to the quantum token after generation. In some embodiments, once the object-specific quantum token has been generated, the object-specific quantum token may be stored (including the identifier and/or data of the associated specific object) in a repository, such as the digital ledger repository 235. In some embodiments, the object-specific quantum token may be stored with the specific object within the repository (e.g., digital ledger repository 235).

As shown at operation 330, the apparatus (e.g., digital ledger access server 210) includes means, such as processor 202, input/output circuitry 203, communications circuitry

204, digital ledger access circuitry 205, and/or the like, for deriving one or more classical public keys associated with the quantum token. By way of non-limiting example, the classical public key may be generated and/or derived based on the object-specific quantum token, wherein the classical public key may be generated by a certificate authority. In some embodiments, and once the classical public key has been generated, the classical public key may be associated with the quantum token of object-specific quantum token. In some embodiments, such an association may be stored in the digital ledger repository 235 by storing the classical public key with an identifier of the quantum token and/or storing the quantum token with an identifier of the classical public key(s).

In some embodiments, a plurality of classical public keys may be copied for multiple users and/or owners of an object associated with the object-specific quantum token, wherein the plurality of classical public keys may be a plurality of copies of the same classical public key which is distributed to the multiple users and/or owners. In some embodiments, a plurality of classical public keys may be generated for an object-specific quantum token of an object and then may be distributed to the multiple users and/or owners of the object. In such an embodiment, the plurality of classical public keys may be different for each user and/or owner of the classical public keys. In some embodiments, the digital ledger access server 210 and/or digital ledger access system 200 may track each of the quantum tokens for the digital ledger of objects and each associated classical public key for the objects, even in instances in which a plurality of classical public keys are generated for an object-specific quantum token.

In some embodiments, the digital ledger access server 210 and/or digital ledger access system 200 may generate a resolution of access for each classical public key, wherein a plurality of resolutions of access may be chosen in order to determine a resolution of access for a specific object. In some embodiments, the resolution access level may be associated with a specific classical public key, or the resolution access level may be associated with the object-specific quantum token, wherein once the classical public key is validated the object may be shown (e.g., illustrated, rendered, etc.) and/or accessed by the user at a specified resolution level (e.g., a resolution level may include a certain amount of pixels to clearly display or at least partially obscure the object).

As shown at operation 340, the apparatus (e.g., digital ledger access server 210) includes means, such as processor 202, input/output circuitry 203, communications circuitry 204, digital ledger access circuitry 205, and/or the like, for determining an attempt to access the object. By way of non-limiting example, a user of the digital ledger access server 210 and/or digital ledger access system 200 may seek to access an object of the digital ledger of objects by using a client device (e.g., client device 101A-101N) that is in communication with the digital ledger access server 210 and/or digital ledger access system 200.

By way of a non-limiting example, an attempt to access the object may include a user inputting in credentials (e.g., user authentication data) that may further include an identifier of a specific object the user may wish to view, modify (e.g., update and/or change data of the object), listen to, and/or interact with the object. In some embodiments, the digital ledger access server 210 and/or digital ledger access server 200 may take the user authentication data of the user, the identifier of the requested object by the user, and/or the classical public key of the user to determine if an attempt has been made.

In some embodiments, a user may use a single sign-on authentication method through the user's authentication data and the classical public key(s) associated with the user's authentication data to input into the digital ledger access server 210 and/or digital ledger access system 200. Such a single sign-on mechanism may be used to access a plurality of objects after the classical public key(s) have been validated, such that only one input of the user's authentication data and classical public key(s) are needed by the digital ledger access server 210 and/or digital ledger access system 200.

In some embodiments, and as shown at operation 350, the apparatus (e.g., communication access server 210) includes means, such as processor 202, input/output circuitry 203, communications circuitry 204, digital ledger access circuitry 205, and/or the like, for providing access to the object in response to a validation of the classical public key based on the quantum token. In some embodiments, and by way of non-limiting example, once a user has attempted to access an object of the digital ledger of objects. The user-provided classical public key may be validated by the digital ledger access server 210 and/or digital ledger access system 200 to provide access to the object, whereby the classical public key may be validated based on its association with the object-specific quantum token of the object to which the user is attempting access.

In some embodiments, and as shown at operation 360, the apparatus (e.g., communication access server 210) includes means, such as processor 202, input/output circuitry 203, communications circuitry 204, digital ledger access circuitry 205, and/or the like, for precluding access to the object in response to an invalidation of the classical public key based on the quantum token. In some embodiments, and by way of non-limiting example, once a user has attempted to access an object of the digital ledger of objects, the user-provided classical public key may be invalidated by the digital ledger access server 210 and/or digital ledger access system 200. The invalidation may occur based on the non-association of the classical public key provided by the user and the object-specific quantum token associated with the object the user sought to access. In some embodiments, the preclusion of access to the object may comprise a user's inability to view (e.g., fully view or view at a high resolution), listen, modify/change, and/or interact with the object in general.

In some embodiments, the preclusion of access may include a user's ability to view the object at a lower resolution (e.g., the resolution access level may be limited to lower pixel values for the object), such that a user may only view certain portions of the object. In some embodiments, the preclusion of access may include a user's ability to clearly see the object (e.g., at a specified resolution), but may include the user's inability to interact, modify and/or change the object. In some embodiments, the types of preclusion of access may be predetermined by the owner of the object and/or based upon each user's classical public key.

FIG. 4 depicts a flowchart that illustrates a series of operations or process blocks for session authentication, in accordance with some example embodiments of the present disclosure. The operations illustrated in FIG. 4 may, for example, be performed by, with the assistance of, and/or under the control of one or more apparatuses, such as digital ledger access server 210, as described above. In this regard, performance of the operations may invoke one or more of memory 201, processor 202, input/output circuitry 203, communications circuitry 204, and/or digital ledger access circuitry 205. Certain operations may be considered optional, as indicated by the dashed lines.

In some embodiments, and as shown at operation 410, the apparatus (e.g., digital ledger access server 210) includes means, such as processor 202, input/output circuitry 203, communications circuitry 204, digital ledger access circuitry 205, and/or the like, for authenticating a session of a user associated with the one or more classical public keys based on a user-specific passcode. By way of non-limiting example, and in some embodiments, the digital ledger access server 210 and/or digital ledger access system 200 may—after determining an attempt to access an object has occurred—authenticate a session of a user based on a user-specific passcode which may be included within the user authentication data input into the digital ledger access server 210 and/or digital ledger access system 200. In some embodiments, the user-specific passcode may be used in a single sign-on authentication method, such that the digital ledger access server 210 and/or digital ledger access system 200 may use the user-specific passcode to determine and/or access a plurality of classical public keys associated with the user which may be used to access a plurality of objects (and associated object-specific quantum token) associated with each classical public key. In this manner, once the user has inputted the user-specific code, the user may also access a plurality of objects that the user's associated classical public keys are determined to have access to without a separate verification process.

FIG. 5 depicts a flowchart that illustrates a series of operations or process blocks for modifying a mechanism by which access to the object is precluded, in accordance with some example embodiments of the present disclosure. The operations illustrated in FIG. 5 may, for example, be performed by, with the assistance of, and/or under the control of one or more apparatuses, such as digital ledger access server 210, as described above. In this regard, performance of the operations may invoke one or more of memory 201, processor 202, input/output circuitry 203, communications circuitry 204, and/or digital ledger access circuitry 205. Certain operations may be considered optional, as indicated by the dashed lines.

In some embodiments, and as shown at operation 510, the apparatus (e.g., digital ledger access server 210) includes means, such as processor 202, input/output circuitry 203, communications circuitry 204, digital ledger access circuitry 205, and/or the like, for determining a security priority for each of the objects of the plurality of objects. By way of non-limiting example, a security priority for each of the objects of the plurality of objects may comprise a certain security measure for each of the objects including, but not limited to: destroying the object, destroying all versions of the object within the digital ledger of objects, destroying the object and a certain plurality of previous versions of the object within the digital ledger of objects, alerting the owner of the object without destruction of the object, state collapse (e.g., of the photons/qubits used in the quantum token), and/or the like. In some embodiments, the security measure for each object may be predetermined by the owner(s) of the object and/or the plurality of versions of the objects within the digital ledger of objects (e.g., the entire chain of object versions).

In some embodiments, a security priority for each of the objects within the digital ledger of objects may be determined based at least in part upon a resource usage parameter associated with generating the specific object. In some embodiments, the resource usage parameter may be based on a power used to generate the object, which may include a human power to generate the object (e.g., difficulty associated with, or time devoted to generating the object); a computational power (e.g., the wattage used); time used to generate the object; and/or the like. In some embodiments, the larger the resource usage parameter used to generate the object, the greater the security priority. For example, a relatively high security parameter may include the full destruction of the object and/or the objects within the chain of object versions in response to an unauthorized attempt to access the object. By way of non-limiting example, the greater the security priority, the more likely the object may be destroyed if access is precluded by the digital ledger access server 210 and/or digital ledger access system 200 at operation 360 of FIG. 3. Similarly, if the security priority is lower (e.g., the resource usage parameter is less), then the less likely the object will be completely destroyed.

Although described herein with reference to destruction of the object or versions of the object, the present disclosure contemplates that the security priority may further influence any other characteristic or operation associated with the object. For example, a greater security priority may result in a more complex or sophisticated cryptographic technique used to secure the object. In some embodiments, the security priority may be based on the specific user associated with the quantum token and/or the object. The specific user may predetermine security priorities for each of their associated objects, individually or as a totality (e.g., all the objects associated with the user may include the same security priority).

In some embodiments, and as shown at operation 520, the apparatus (e.g., digital ledger access server 210) includes means, such as processor 202, input/output circuitry 203, communications circuitry 204, digital ledger access circuitry 205, and/or the like, for modifying a mechanism by which access to the object is precluded based upon the determined security priority for the object. By way of non-limiting example, the modification of a mechanism by which access to the object is precluded may include at least one of collapsing a state of the object (e.g., collapsing the qubits of the quantum token), generating a message interface object, generating an input request, and/or the like.

In some embodiments, the method for access to the object-based on the determined security priority of the object and based on the preclusion of access to the object—may be modified to include the collapsing of the state of the qubits used to generate the quantum token such that the object is also destroyed. In some embodiments, the method for access to the object-based on the determined security priority of the object and based on the preclusion of access to the object—may be modified to include the generation of a message interface object to be presented to a user of the digital ledger access server 210 and/or digital ledger access system 200 when the access of the object is precluded. In some embodiments, the message interface object may configure a graphical user interface of the client device(s) 101A-101N to request input by the user associated with the object for which the access request was denied, wherein the message interface object may alert the user that the object was attempted access by an unvalidated classical public key and/or request instructions from the user detailing how the digital ledger access server 210 and/or digital ledger access system 200 should handle the unvalidated access (e.g., destroy the object, change the quantum token, change the resolution access level of the object, and/or the like). In other words, the operations of FIG. 5 may operate to provide dynamic access preclusion based upon the particular user associated with an object, the type of access attempted by a user, the nature of the underlying object, etc.

Example Use Cases of Digital Ledger Access Server and Digital Ledger Access System In some embodiments, the digital ledger access server 210 and/or digital ledger access system 200 may be used in certain environments to promote privacy in certain technical fields. For instance, the digital ledger access server 210 and/or digital ledger access system 200 may be used for a digital ledger of objects associated with healthcare objects which may be interacted with by a plurality of healthcare providers to promote collaboration without losing previous iterations/versions of the healthcare objects. In some embodiments, the healthcare objects may include data regarding specific patients, specific medicinal data (e.g., data regarding patients in a medical trial for a specific drug), and/or the like, where data must be kept in real-time as it changes, but also previous iterations of historical data must be kept intact.

In some embodiments, the digital ledger access server 210 and/or digital ledger access system 200 may be used in certain environments to track what users and/or parties of users are accessing objects and attaching quantum tokens to objects. In some embodiments, this tracking of objects and their associated object-specific quantum tokens may be used to collect data on each instance of the accessing of objects.

In some embodiments, the digital ledger access server 210 and/or digital ledger access system 200 may be used in certain environments to trace objects and their specified versions— including versions comprising the updating of data—to track bugs and other impediments in the objects. In some embodiments, this use may also be used to trace back through versions to recreate and/or discover features within previous versions of the object that may have been involuntarily redacted or removed. By way of a particular example, a quantum token for a particular user may provide the ability for this user to monitor access to the data stored by the object, as related to self-sovereign data implementations or otherwise.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for securing objects in a digital ledger of objects, the method comprising:
   identifying an object from amongst a plurality of objects in the digital ledger of objects;
   generating a quantum token for attachment with the object, wherein the quantum token is an object-specific quantum token for the object;
   deriving one or more classical public keys associated with the quantum token;
   receiving, from a user, a classical public key to access the object;
   providing access to the object in response to a validation of the classical public key based on the quantum token; and
   precluding access to the object in response to an invalidation of the classical public key based on the quantum token.

2. The method according to claim 1, further comprising authenticating a session of the user associated with the one or more classical public keys based on a user-specific passcode.

3. The method according to claim 1, wherein each object of the plurality of objects comprises an object-specific quantum token.

4. The method according to claim 3, wherein an object-specific classical public key is derived for each object-specific quantum token.

5. The method according to claim 3, wherein a plurality of object-specific classical public keys are generated for each object-specific quantum token.

6. The method according to claim 5, wherein each object-specific classical public key is associated with a respective resolution access level of the object such that a resolution of the object varies based upon the object-specific classical public key validated to provide access to the object.

7. The method according to claim 1, wherein precluding access to the object further comprises:
determining a security priority for each of the objects of the plurality of objects; and
modifying a mechanism by which access to the object is precluded based upon the determined security priority for the object.

8. The method according to claim 7, wherein the security priority for each object of the plurality of objects is determined based at least in part upon a resource usage parameter associated with generating the respective object.

9. The method according to claim 7, wherein the security priority for each of the objects of the plurality of objects is determined based at least in part upon the user associated with the quantum token attached with the object.

10. The method according to claim 7, wherein precluding access to the object comprises one or more of collapsing a state of the object, generating a message interface object comprising an indication of the invalidation of the one or more classical public keys, or generating an input request for providing to the user associated with the object.

11. An apparatus for securing objects in a digital ledger of objects comprising at least one processor and at least one memory, the at least one memory having computer-code instructions stored thereon that, in execution with the at least one processor, configure the apparatus to:
identify an object from amongst a plurality of objects in the digital ledger of objects;
generate a quantum token for attachment with the object, wherein the quantum token is an object-specific quantum token for the object;
derive one or more classical public keys associated with the quantum token;
receive, from a user, a classical public key to access the object;
provide access to the object in response to a validation of the classical public key based on the quantum token; and
preclude access to the object in response to an invalidation of the classical public key based on the quantum token.

12. The apparatus according to claim 11, wherein each object of the plurality of objects comprises an object-specific quantum token.

13. The apparatus according to claim 12, wherein an object-specific classical public key is derived for each object-specific quantum token.

14. The apparatus according to claim 12, wherein a plurality of object-specific classical public keys are generated for each object-specific quantum token.

15. The apparatus according to claim 14, wherein each object-specific classical public key is associated with a respective resolution access level of the object such that a resolution of the object varies based upon the object-specific classical public key validated to provide access to the object.

16. A computer program product for securing objects in a digital ledger of objects comprising at least one non-transitory computer-readable storage medium having computer program code thereon that, in execution with at least one processor, configures the computer program product for:
identifying an object from amongst a plurality of objects in the digital ledger of objects;
generating a quantum token for attachment with the object;
deriving one or more classical public keys associated with the quantum token, wherein the quantum token is an object-specific quantum token for the object;
receiving, from a user, a classical public key to access the object;
providing access to the object in response to a validation of the classical public key based on the quantum token; and
precluding access to the object in response to an invalidation of the classical public key based on the quantum token.

17. The computer program product according to claim 16, wherein each object of the plurality of objects comprises an object-specific quantum token.

18. The computer program product according to claim 17, wherein an object-specific classical public key is derived for each object-specific quantum token.

19. The computer program product according to claim 17, wherein a plurality of object-specific classical public keys are generated for each object-specific quantum token.

20. The computer program product according to claim 19, wherein each object-specific classical public key is associated with a respective resolution access level of the object such that a resolution of the object varies based upon the object-specific classical public key validated to provide access to the object.

* * * * *